(12) United States Patent
Bliss et al.

(10) Patent No.: US 6,823,518 B1
(45) Date of Patent: Nov. 23, 2004

(54) THREADING AND COMMUNICATION ARCHITECTURE FOR A GRAPHICAL USER INTERFACE

(75) Inventors: Andrew L. Bliss, Redmond, WA (US); Andre F. Vachon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 962 days.

(21) Appl. No.: 09/690,675

(22) Filed: Oct. 17, 2000

(51) Int. Cl.[7] ............................................... G06F 9/54
(52) U.S. Cl. .................... 719/310; 718/100; 717/125; 710/240
(58) Field of Search ........................... 718/100–108; 719/310–320; 345/700–866; 717/124–133; 710/200–244

(56) References Cited

U.S. PATENT DOCUMENTS

| | | | |
|---|---|---|---|
| 5,892,941 A | | 4/1999 | Khan et al. ................... 703/22 |
| 6,147,687 A | * | 11/2000 | Wanderski ................... 345/853 |
| 6,378,124 B1 | * | 4/2002 | Bates et al. ................. 717/129 |
| 6,378,125 B1 | * | 4/2002 | Bates et al. ................. 717/129 |
| 6,473,820 B1 | * | 10/2002 | Zhang ......................... 710/240 |

OTHER PUBLICATIONS

Varga, A., "*Using the OMNeT++ Discrete Event Simulation System in Education*", IEEE Transactions on Education, vol. 42, No. 4, Nov. 1999, p. 372.

Leen–Kiat Soh, et al., "*MAGE: Multi–Agent Graphical Environment*", Intelligent Agents in Cyberspace. Papers from the 1999 AAAI Symposium, 1999, p. 128–135.

* cited by examiner

Primary Examiner—St. John Courtenay, III
(74) Attorney, Agent, or Firm—Amin & Turocy, LLP (57) ABSTRACT

A system and method to facilitate communication between a user interface and an associated process is disclosed. A first thread is associated with the user interface and a second thread is associated with the process for implementing requests by the user interface. At least one state buffer is operable to store state data for controlling ownership to the state buffer by the first and second threads for communicating data between the first and second threads. The architecture may be used in connection with a debugging system, such as to facilitate responsive interaction between the GUI and the associated debugging system.

34 Claims, 6 Drawing Sheets

THREADING AND COMMUNICATION ARCHITECTURE FOR A GRAPHICAL USER INTERFACE

TECHNICAL FIELD

The present invention relates to computer programming and, more particularly, to a threading and communication architecture for a graphical user interface.

BACKGROUND

A graphical user interface (GUI) typically is associated with a process (or an engine) that executes computer-executable instructions in response to requests and/or information provided by the GUI. In certain types of applications, the GUI may appear non-responsive to a user while the process is executing a request, which may occur due to blocking by the process. Blocking often is due to the particular communication architecture employed to enable interactions between the GUI and the associated application. For example, it is common to employ a single threaded system in which blocking may occur while each request or command from the GUI is being processed. This creates an environment that tends to be insufficiently responsive to user commands, resulting in undesirable delays.

One particular application in which GUI responsiveness is desired regardless of the state of the process is a debugging system. A debugging system provides a tool for debugging various types of software systems. For example, programmers may employ a debugging system for kernel debugging, such as may be associated with device driver code as well as other, more general, program debugging. Some debugging systems are implemented to debug single target software whereas others may allow multiple users to concurrently debug a common software target. A user may interact with a GUI of the debugging system to enter commands and see status information on an associated display. Users of debugging systems, most of whom are programmers, demand and/or expect responsiveness of the debugging system.

SUMMARY

The present invention relates to a threading and communication architecture for managing communications between a process or engine and an associated user interface. The interface employs a multi-threaded model. A first thread is responsible for processing interface activity such as window messages, dialogs, menus and so on. A second thread carries out engine operations. The threads are connected through a dynamic array object called a state buffer. A state buffer holds information retrieved from the engine and also queues commands from the interface thread to the engine thread. State buffers also serve as a primary synchronization mechanism between the threads. As a result, the architecture provides a user-friendly environment that mitigates pauses at the user interface. The architecture may be implemented in connection with a graphical user interface of a debugger system, such as may be utilized for debugging computer code.

Another aspect of the present invention provides a system to facilitate communication between a user interface and a process. The system includes a first thread associated with the user interface. A second thread is associated with the process for implementing requests by the user interface. At least one state buffer object is operable to store state data for controlling ownership to itself by the first and second threads for retrieving or filling other data to the state buffer object.

Yet another aspect of the present invention provides a multi-threaded architecture for a debugger system. The architecture includes a user interface thread to facilitate user interaction with the debugging system. An engine thread is associated with a debugger process and responsive to requests from the user interface thread. A state buffer stores state data adapted to control ownership to the state buffer by at least one of the user interface thread and the engine thread. The user interface thread and engine thread communicate other data through the state buffer so as to mitigate pausing at the user interface.

Still another aspect of the present invention provides a method for synchronizing data communication between at least two threads in a multi-threaded architecture. The method includes receiving at a state buffer a request from a first thread and updating control data at the state buffer to a first condition based on the request. The condition of the control data is detected at a second thread and other data is provided to the state buffer, such as by the second thread. The control data is updated to a second condition based on the condition of the state buffer. Retrieval by the first thread of the other data is controlled as a function of the condition of the control data.

Another aspect of the present invention provides a computer-readable medium having computer executable instructions. A first thread is created associated with a user interface and a second thread is created associated with an engine. At least one state buffer is generated to store state data and other data. The state buffer is programmed to control ownership of the state buffer by the first and second threads based on the state data for retrieving or filling the other data to the state buffer.

Yet another aspect of the present invention relates to a data structure for a state buffer. The data structure includes a first field for storing request data received from a user interface and a second field for storing completion data indicative of each request that has been completed by an associated process. A notification field stores notification data indicative of each completed request. The data structure also includes a data field for storing data provided in response to each request stored in the first field.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention provides a multi-thread model that facilitates communication between an interface and a process. In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram form in order to facilitate description of the present invention.

Figure 1:
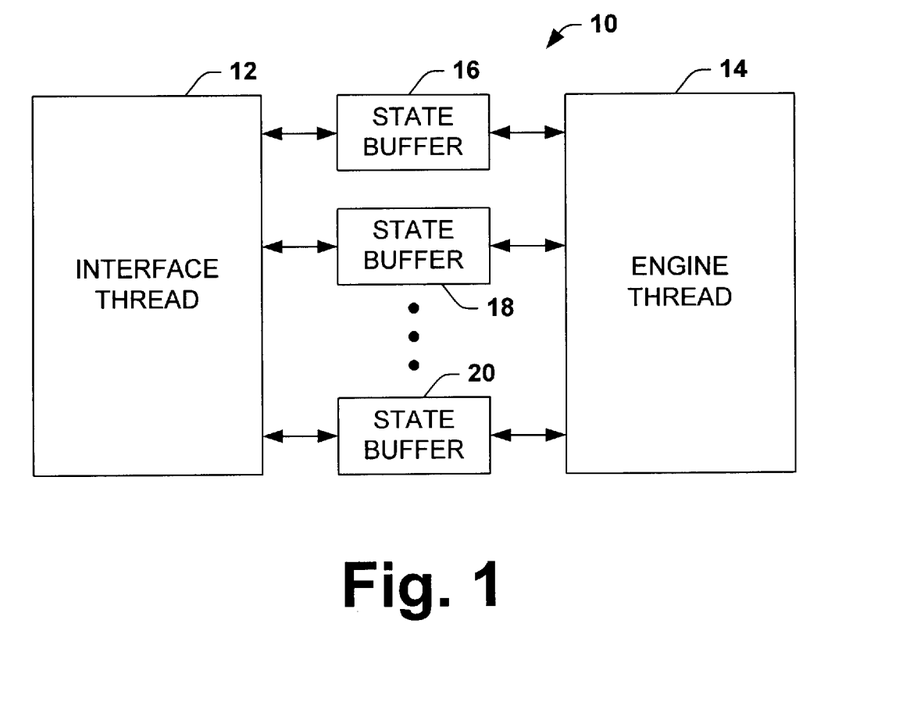
FIG. 1 is a functional block diagram of a communication architecture in accordance with the present invention.

Turning now to FIG. 1, an example of a system 10 implemented according to a threading and communication architecture of the present invention is illustrated. The system 10 includes two threads, namely, an interface thread 12 and an engine thread 14. The interface thread 12 is operable to process user interface activity, such as window messages, dialogs, menus, commands, etc. The engine thread 14 performs engine operations, such as providing instructions and retrieving data to and from the associated application engine. In accordance with an aspect of the present invention, the application engine may correspond to a debugging system to facilitate debugging of computer code.

The two threads 12 and 14 are operatively linked or connected through one or more dynamic objects, hereinafter referred to as a state buffers 16, 18, and 20. Each state buffer 16, 18, 20 holds information retrieved from the engine thread 14 as well as queues commands and requests from the interface thread 12 to the engine thread. The state buffers 16, 18, and 20 also serve as a synchronization system between the threads.

By way of example, when the associated application is initiated, only the interface thread 12, which is the main thread of the system 10, is initially active. The interface thread 12 may perform usual application initialization operations, such as command-line parsing, creation of the initial GUI elements, etc. The interface thread 12 also gathers information about the process to be performed from command-line arguments, menu selections and dialog boxes.

After the interface thread 12 collects enough information to start an application session, it may determine whether the application session can be created at all by making some initial calls to the application engine. If the application engine successfully starts a session, the interface thread 12 may then create the engine thread 14 and then return to normal window message processing. The interface thread 12 is not required to wait on the interface engine 14 for information; instead it is notified when information is available. As a result, the interface thread 12 is available for user operations while the engine thread 14 handles communication with the associated engine.

The engine thread 14 is responsible for all major use of the associated application engine. The engine thread 14, for example, reads a queue of commands from the interface thread 12, such as may be stored in state buffers 16, 18, and 20, and carries out active requests. It checks all existing state buffers and refills those that have become invalid (e.g., invalid indicating that one or more active requests or commands may exist). The engine thread also may respond to callbacks from the engine and queue output to the state buffers 16, 18, and 20 for retrieval by the interface thread 12. The engine thread 14 also tracks the state of the debugging session and, if necessary, it may invalidate a state buffer. The engine thread 14 may terminate when an application session is stopped or restarted, such as in response to commands provided by the interface thread 12.

The operations performed by the engine thread 14 may take significant amounts of time, which may cause the engine thread to be busy for long periods of time. In order to preserve interface responsiveness, the system 10 is arranged so that the interface thread 12 is not required to wait on the engine thread 14, as that could cause a delay in interface activity of unknown length. In particular, the interface thread 12 sends all commands and receives all responses asynchronously through synchronized queues of commands and responses, which are held in the state buffers 16, 18, and 20. Each state buffer 16, 18, 20 includes a dynamically resizable block of bytes that can hold commands and/or responses.

Figure 2:
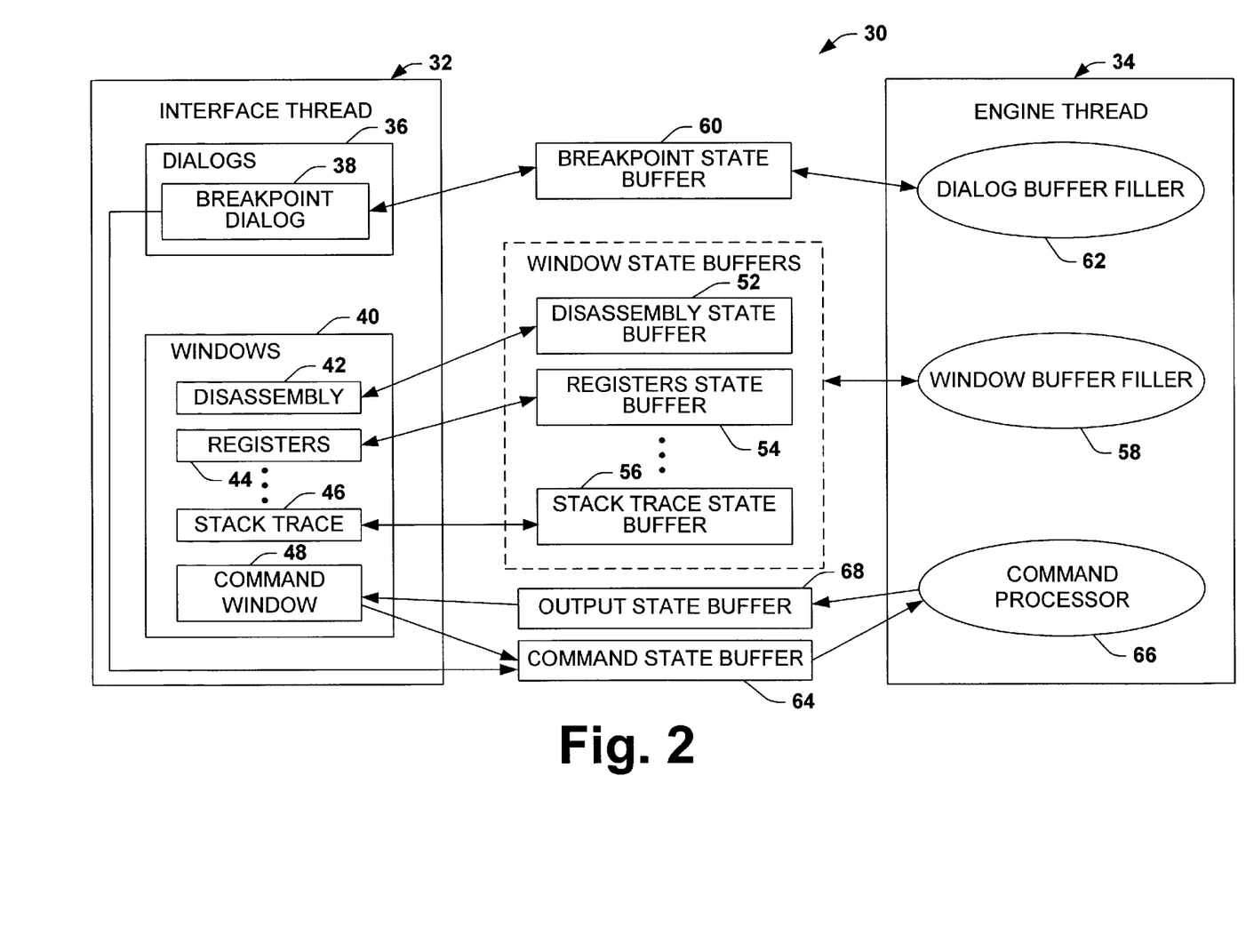
FIG. 2 is another functional block diagram of a communication architecture in accordance with the present invention.

FIG. 2 illustrates another example of a system 30 implemented in accordance with a threading and communication architecture of the present invention. The system includes an interface thread 32 and an engine thread 34, which communicate with each other through one or more state buffers. By way of illustration, the example of FIG. 2 is directed to an architecture 30 that may be utilized in conjunction with a debugging system. Those skilled in the art will understand and appreciate that a system, in accordance with the present invention, has broader applications.

The interface thread 32 includes user interface elements for receiving user instructions and providing corresponding information. For example, the interface thread may include dialogs 36, such as a breakpoint dialog box 38. The interface thread 32 also includes window interface elements 40, such a disassembly window element 42, register window elements 44, a stack trace element 46, etc. The window interface element 40 further may include a command window element 48, which may receive user-entered commands. Other interface elements also could be utilized in accordance with the present invention.

In accordance with an aspect of the present invention, each user interface element may have a dedicated state buffer that provides a separate communication channel between the interface elements and the engine thread 34. Several state buffers thus may exist concurrently. For example, the disassembly window 42 is associated with a disassembly state buffer 52, the register window 44 is associated with a register state buffer 54, the stack trace window 46 is associated with a stack trace state buffer 56, etc. Each of the state buffers 52, 54, 56 operates as a communications channel to communicate information between the engine thread 34 and the interface thread 32 and for controlling its associated window. A window buffer filler routine 58 is employed within the engine thread 34 to fill information to each window state buffer 52, 54, 56.

As window elements 40 are created and destroyed, corresponding state buffers may, in turn, be created and destroyed. By way of illustration, when a new window element is created, a state buffer is created for it and added to the list of active state buffers. The engine thread 34 will eventually get around to filling the state buffer and posting a completion message to the associated window element, at which point the window can employ the state buffer to refresh its display accordingly. When a window is destroyed, its associated state buffer is no longer needed and, thus, may be deleted when possible. To help improve system 30 operation, when an interface thread 32 destroys a window, it puts the associated state buffer into a disconnected state. When the engine thread 34 checks a state buffer to determine whether it is up-to-date or not, it also may check to see if the state buffer is disconnected. If the state buffer is disconnected, the engine thread 34 knows that it can safely delete the state buffer as the interface thread is no longer using it. As a result, access issues concerning the state buffers are mitigated.

Each dialog element 36 also has an associated state buffer 60. The engine thread 34 monitors and fills the state buffer 60 with information, such as user-entered data or operating characteristic information about the associated application or engine. In this example, the state buffer 60 is the breakpoint dialog element 38, which has an associated breakpoint state buffer 60. The breakpoint dialog 38, for example, may present a list of the current breakpoints and allows the user to add, change, or delete breakpoints. The breakpoint state buffer 60 tracks the current breakpoint state and the breakpoint dialog 38 utilizes the buffer to append its list of breakpoints when it is active. The dialog state buffers also have a dialog buffer filler routine 62 for providing dialog-related information. In the illustrated example, the engine thread 34 employs the dialog buffer filler routine 62 to fill data to the breakpoint state buffer 60 based on requests queued in the breakpoint state buffer. Those skilled in the art will understand and appreciate that the dialog buffer filler routine 62 also may be utilized to fill information to other types of dialog state buffers.

Commands, both as the result of UI operations, such as menu selections, dialog box activity, and commands typed in the command window 48, are queued in a command state buffer 64 for processing by the engine thread 34. In this particular example, a single state buffer 64 is employed to help keep the command stream sequential and ordered according to the user's requests, although more than one buffer could be used in accordance with the present invention. Placing a command in the command state buffer 64 awakens the engine thread 34. The engine thread 34 includes a command processor component (e.g., a method or process) 66 that, in turn, checks the state of the command buffer object 64 and dequeues and processes outstanding commands.

The command processor 66 of the engine thread 34 may process commands to generate output from the application engine (e.g., the debugger system). Such output is sent to the engine thread 34 via output callbacks that the engine thread registers. The engine thread 34 employs the command processor 66 to queue the output in a special output state buffer 68 for eventual display by the interface thread 32 in the command window 48. Again, a single command state buffer 64 may be used for all output in order to help maintain the order of outputs based on the order that the engine thread 34 received the commands. Alternatively, several command-type state buffer could be utilized in place of the command state buffer 64; each such state buffer, for example, being operable to process different types of commands.

Activity associated with the breakpoint dialog 38, such as adding or changing a breakpoint, also may result in the breakpoint dialog sending a command to the engine thread 34 through the command state buffer 64. In this way, all commands may be communicated through the command state buffer 64 to help control and prioritize commands. In response to sending the command, the breakpoint dialog 38 may put a placeholder message in its breakpoint list, indicating that the user's request is pending. At some point, the engine thread 34 will process the breakpoint dialog's command with an engine call, such as with the command processor 66. If the command is valid, the engine may notify the engine thread 34 that breakpoints have changed, which will trigger a refresh request on the breakpoint state buffer 60. Upon refreshing the breakpoint state buffer 60, the object will be checked to determine if it is associated with a window element. When the breakpoint dialog 38 exists, for example, the breakpoint state buffer 60 will be associated with the breakpoint dialog. This enables the engine thread 34 to send an update message to the dialog element 38, which results in the breakpoint dialog 38 refreshing its list and the pending placeholder is replaced by appropriate output. If the breakpoint dialog is not displayed, the engine thread 34 may not send a notification and the breakpoint buffer object may serve as a passive cache of information.

In accordance with an aspect of the present invention, the state buffers also serve as a synchronization mechanism between the two threads 32 and 34. State buffer synchronization allows the interface thread 32 to query the readiness of a state buffer without blocking on a synchronization object. The synchronization also allows the interface thread 32 and the engine thread 34 to make requests for content in a state buffer without blocking on a synchronization object. Only when the actual content of a state buffer is being read or written is it desirable to hold a synchronization object associated with the state buffer to block access to the state buffer by the other thread.

Figure 3:
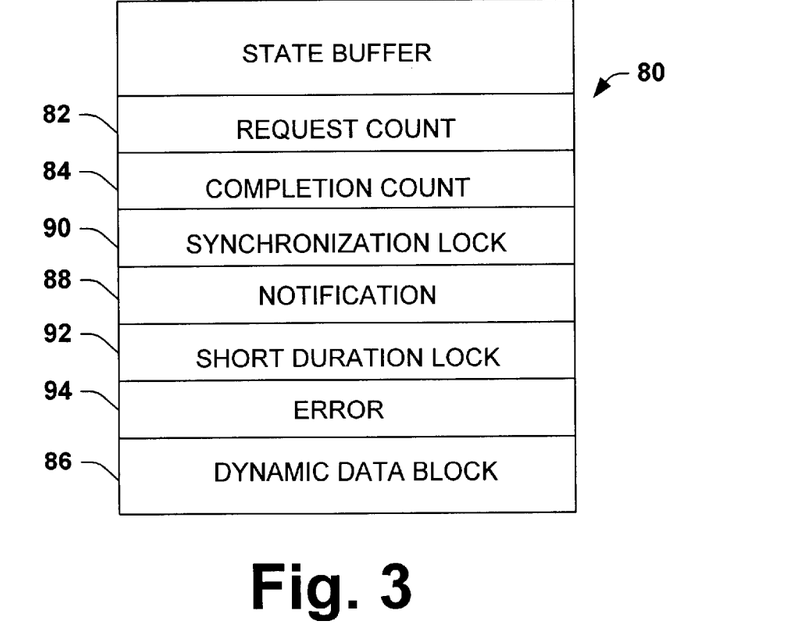
FIG. 3 is an example of a data structure for a state buffer in accordance with the present invention.

FIG. 3 illustrates an example of a data structure 80 for a state buffer. As described herein, state buffers facilitate communication and synchronization between the threads 32 and 34. The state buffer data structure 80 includes a plurality of methods and/or elements that cooperate to provide the desired communication between the threads while also maintaining their operational independence.

In order to help synchronize the interface thread 32 and the engine thread 34 as well as control use of a state buffer, the state buffer data structure 80 includes a request count 82 and a completion count 84. The request count 82 maintains a request count value that is incremented in an interlocked fashion each time a request is made, such as from a corresponding one of the interface elements 38, 42, 44, 46, and/or 48. Interlocked operations of the state buffer are synchronized, but of short duration, so making a request does not cause a noticeable pause (to the user) in operation of the requesting thread.

The completion count 84 also maintains a value that is incremented upon completion of a request by the engine thread 34 for the associated state buffer. State buffers are created, for example, with a request count of one and a completion count of zero, so that the state buffer begins in an invalid state. That is, a state buffer initially has a mismatch between its request count 82 and its completion count 84, as it has no content yet. A mismatch between the request count 82 and the completion count 84 indicate that requests are outstanding and the state buffer should be refreshed.

Ownership to a state buffer by one of the threads 32 or 34 (FIG. 2) may vary as a function of the request count 82 and the completion count 84. These two counts may operate to establish synchronization lock for the state buffer data structure, which controls access to and/or ownership of the state buffer by the threads.

By way of example, when a request is made, the interface thread 32 sets an event on which the engine thread 34 waits, awakening the engine thread. The engine thread 34 then scans the list of active state buffers, checking to see whether the request count 82 is different from the completion count 84. If there is a mismatch, requests are outstanding and the state buffer should be refreshed, such as by filling information into a dynamic data block 86 associated with the state buffer.

At the point that the engine thread 34 checks the request count 82, the engine thread stores the request count in a local variable. After a corresponding state buffer fill routine has completed, the engine thread 34 uses the saved value to update the completion count 84. The caching of the completion value allows further requests to come in during the actual filling time. If the interface thread makes additional requests to the state buffer, the request count 82 will continue to be different from the completion count 84. Consequently, the engine thread will come around again and fill the data block 86 of the state buffer with corresponding information. This check/fill loop may continue until the completion count 84 matches the request count 82. When the data block 86 of the state buffer has been filled, the engine thread 34 posts a window message to any associated window to notify it of the change in the state buffer status. The notification may occur through a notification element 88 of the state buffer data structure 80. The notification element 88, for example, is a method for posting the message to an appropriate window, such as to indicate the current status of a pending request and/or other information provided in response to a request or command.

The interface thread 32 includes a lock routine that is utilized to access content of a state buffer. In response to receiving a posted message about a state buffer state change, for example, the interface thread 32 attempts to lock the state buffer so that it can access the content. In the lock routine, for example, the request count 82 is compared to the completion count 84. If the count values do not match, the pending requests on the state buffer will invalidate the state buffer (e.g., a mismatch) at some point in the future so the current content is irrelevant and the lock fails. If the lock fails, the interface thread 32 may place an appropriate message in the window to indicate that the information is being updated.

If the request count 82 and completion count 84 values match, a synchronization object 90 is acquired by the lock routine. The acquired synchronization object 90 is utilized to lock the state buffer for access by the interface thread 32. The interface thread 32, in turn, reads the information from the data block 86 of state buffer, which information is used to update an associated window. After retrieving the information, the lock routine of the interface thread 32 may release the lock so that the state buffer is available to receive new requests.

In addition to the locks used for synchronizing access to state buffer content, the state buffer data structure 80 also may have another lock 92 for short-duration operations that need immediate synchronization. There is considerably less delay in using the short-duration lock 92 in contrast to a state buffer request/complete mechanism and/or lock, as the thread that needs it simply takes the lock and performs its processing. The short-duration lock 92, as its name implies, is only held for short intervals so this immediate, blocking behavior does not result in perceptible delays in the system operation. The short-duration lock 92 may be held, for example, for about a few tens of milliseconds and is generally held for a shorter period of time.

The short-duration lock 92 may be used for miscellaneous operations that require thread safety but are simple and relatively quick. The short duration lock 92 also may operate as a global synchronization lock for the state buffering mechanism. While most state buffer operations may rely on interlocked operations and read/write atomicity of memory, there are still a few points where larger operations need to be synchronized. For example, adding or removing a state buffer from the list of active state buffers requires thread-safety, which may be provided by the short-duration lock 92.

State buffer content stays valid as long as the request count 82 matches the completion count 84. If the interface thread 32 needs to refresh a window or needs to reexamine the state buffer, it is free to do so as long as no new requests have come in. As a result, the interface thread 32 is able to refresh engine state from the information cached in state buffers even when the engine thread 34 itself is busy doing other things. The use of multiple state buffers further provides fine-grained control over the accessibility of information as the interface thread 32 can access one state buffer while the engine thread 34 is filling a different state buffer. This mitigates dependency of the interface thread 32 on waiting for information from the engine thread 34.

The notification messages are non-blocking and, thus permit requesting interface elements and notifiers to continue without interruption. That is, interlocked read requests to invalidate state buffers and posted window messages when state buffers are filled do not inhibit operation of the other threads. Access to a state buffer is also non-blocking provided that the state buffer is in a valid state. A thread may block on access to a state buffer when one thread needs to fill information to the state buffer and another thread is actively reading from the state buffer. Because the engine thread 34 is the only thread that fills state buffers, however, the interface thread 32 does not block on any of the engine thread's state buffer usage, leaving the engine thread free to respond to user requests at all times. Additionally, the interface thread 32 may not keep a state buffer locked for an extended period of time so the engine thread will generally not be blocked for a significant amount of time by interface thread access.

Referring between FIGS. 2 and 3, as mentioned above, each type of state buffer (e.g., dialog, window, and command objects) has its own routine for filling the state buffer with content. For example, the engine thread 34 monitors each of the state buffers to determine whether any outstanding requests exist. When the engine thread 34 detects that a state buffer is out-of-date and needs to be filled, the engine thread acquires a synchronization object 90 associated with the state buffer and then calls the appropriate filler routine, such as the break point filler 62, the window filler 58, or the command processor 66. The filler routine may perform arbitrary processing during its fill of a state buffer. After a filler routine has completed filling data, the state buffer content may be updated to reflect the completion of the request. If the fill fails, an error code may be returned through an error element 94 of the state buffer data structure 80. The error element 94 is operable to disable the interface thread from reading information of the data block 86 of a state buffer, even in situations when the request count 82 matches the completion count 84. In addition, the error element 94 also may cause the engine thread to refill the information to the state buffer.

The application engine also may provide a broad set of callbacks for monitoring the engine's state. The engine thread 34 registers many of these in order to maintain the various portions of the interface. The engine thread 34 is responsible for receiving these callbacks and implementing the necessary changes. The callbacks, for example, may relate to information held in state buffers or general information about the state of the engine. For information held in state buffers, the engine thread 34 takes advantage of the existing state buffer mechanisms and simply requests a refresh of the appropriate state buffer. This triggers a usual check/fill/post cycle (as described above). Eventually, the state buffer is refreshed, and the interface thread is notified of the change. For global state changes, the engine thread 34 may update the necessary global information directly. The engine thread 34 also may post notification messages to the interface thread 32 for pertinent global changes.

It is to be appreciated that the engine thread's use of callbacks may be naturally extended to handle situations when a user interface is remotely connected to an application session, such as, for example, a remote debugging session connected to a server debugging session. When the user interface is remotely connected to the application session, the current user may be one of a group of users of the current session. Any of the users may cause a change in the session at any time. In the event of such a change, the engine thread 34 will notify all users associated with the session via a callback, and processing may occur in substantially the same manner as with changes originated locally.

In view of the foregoing description, it is shown that a threading and communication architecture, in accordance with an aspect of the present invention provides a responsive system capable of handling various kinds of debugging. In addition, the state buffers operate as functional objects that help keep the graphical portion of the interface in sync with a text-based command window. The interface further allows for remote debugging, stopping and restarting debug sessions and customizability.

Figure 4:
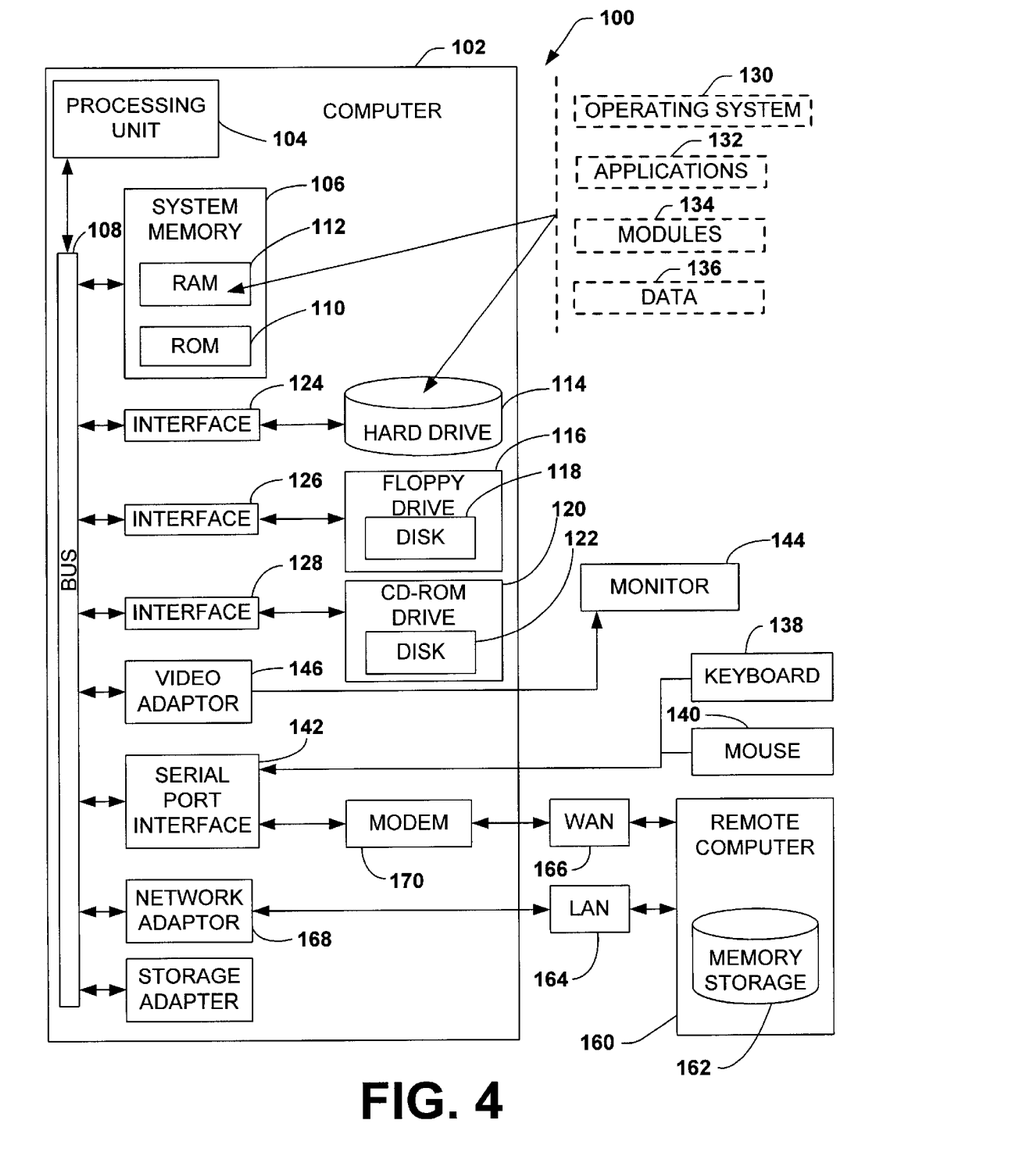
FIG. 4 is an example of an operating environment for a system implemented in accordance with the present invention.

In order to provide additional context for the various aspects of the present invention, FIG. 4 and the following discussion are intended to provide a brief, general description of a suitable computing environment 100 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in both local and remote memory storage devices.

With reference to FIG. 4, an exemplary system environment 100 for implementing the various aspects of the invention includes a conventional computer 102, including a processing unit 104, a system memory 106, and a system bus 108 that couples various system components including the system memory to the processing unit 104. The processing unit 104 may be any of various commercially available processors, including but not limited to Intel x86, PENTIUM and compatible microprocessors from Intel and others, including Cyrix, AMD and Nexgen; ALPHA microprocessors from Digital; MIPS microprocessors from MIPS Technology, NEC, IDT, Siemens, and others; and the POWERPC microprocessors from IBM and Motorola. Dual microprocessors and other multi-processor architectures also may be used as the processing unit 104.

The system bus 108 may be any of several types of bus structure including a memory bus or memory controller, a peripheral bus, and a local bus using any of a variety of conventional bus architectures such as PCI, VESA, Microchannel, ISA, and EISA, to name a few. The system 100 memory includes read only memory (ROM) 110 and random access memory (RAM) 112. A basic input/output system (BIOS), containing the basic routines that help to transfer information between elements within the computer 102, such as during start-up, is stored in ROM 110.

The computer 102 also may include, for example, a hard disk drive 114, a magnetic disk drive 116, e.g., to read from or write to a removable disk 118, and an optical disk drive 120, e.g., for reading from or writing to a CD-ROM disk 122 or other optical media. The hard disk drive 114, magnetic disk drive 116, and optical disk drive 120 are connected to the system bus 108 by a hard disk drive interface 124, a magnetic disk drive interface 126, and an optical drive interface 128, respectively. The drives and their associated computer-readable media provide nonvolatile storage of data, data structures, computer-executable instructions, etc. for the computer 102. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 100, and further that any such media may contain computer-executable instructions for performing the methods of the present invention.

A number of program modules may be stored in the drives and RAM 112, including an operating system 130, one or more application programs 132, other program modules 134, and program data 136. The operating system 130 in the illustrated computer is, for example, one of the MICROSOFT WINDOWS® operating systems, which are available from Microsoft Corporation. It is to be appreciated, however, that the present invention may be implemented with other operating systems or combinations of operating systems.

A user may enter commands and information into the computer 102 through one or more user input devices, such as a keyboard 138 and a pointing device (e.g., a mouse 140). Other input devices (not shown) may include a microphone, a joystick, a game pad, a satellite dish, a scanner, or the like. These and other input devices are often connected to the processing unit 104 through a serial port interface 142 that is coupled to the system bus 108, but may be connected by other interfaces, such as a parallel port, a game port or a universal serial bus (USB). A monitor 144 or other type of display device is also connected to the system bus 108 via an interface, such as a video adapter 146. In addition to the monitor 144, the computer 102 may include other peripheral output devices (not shown), such as speakers, printers, etc.

The computer 102 may operate in a networked environment using logical connections to one or more remote computers 160. The remote computer 160 may be a workstation, a server computer, a router, a peer device or other common network node, and typically includes many or all of the elements described relative to the computer 102, although, for purposes of brevity, only a memory storage device 162 is illustrated in FIG. 4. The logical connections depicted in FIG. 4 may include a local area network (LAN) 164 and a wide area network (WAN) 166. Such networking environments are commonplace in offices, enterprise-wide computer networks, intranets and the Internet.

When used in a LAN networking environment, the computer 102 is connected to the local network 164 through a network interface or adapter 168. When used in a WAN networking environment, the computer 102 typically includes a modem 170, or is connected to a communications server on the LAN, or has other means for establishing communications over the WAN 166, such as the Internet. The modem 170, which may be internal or external, is connected to the system bus 108 via the serial port interface 142. In a networked environment, program modules depicted relative to the computer 102, or portions thereof, may be stored in the remote memory storage device 162. It will be appreciated that the network connections shown are exemplary and other means of establishing a communications link between the computers 102 and 160 may be used.

In accordance with the practices of persons skilled in the art of computer programming, the present invention has been described with reference to acts and symbolic representations of operations that are performed by a computer, such as the computer 102 or remote computer 160, unless otherwise indicated. Such acts and operations are sometimes referred to as being computer-executed. It will be appreciated that the acts and symbolically represented operations include the manipulation by the processing unit 104 of electrical signals representing data bits which causes a resulting transformation or reduction of the electrical signal representation, and the maintenance of data bits at memory locations in the memory system (including the system memory 106, hard drive 114, floppy disks 118, CD-ROM 122, and shared storage system 110) to thereby reconfigure or otherwise alter the computer system's operation, as well as other processing of signals. The memory locations where such data bits are maintained are physical locations that have particular electrical, magnetic, or optical properties corresponding to the data bits.

Figure 5:
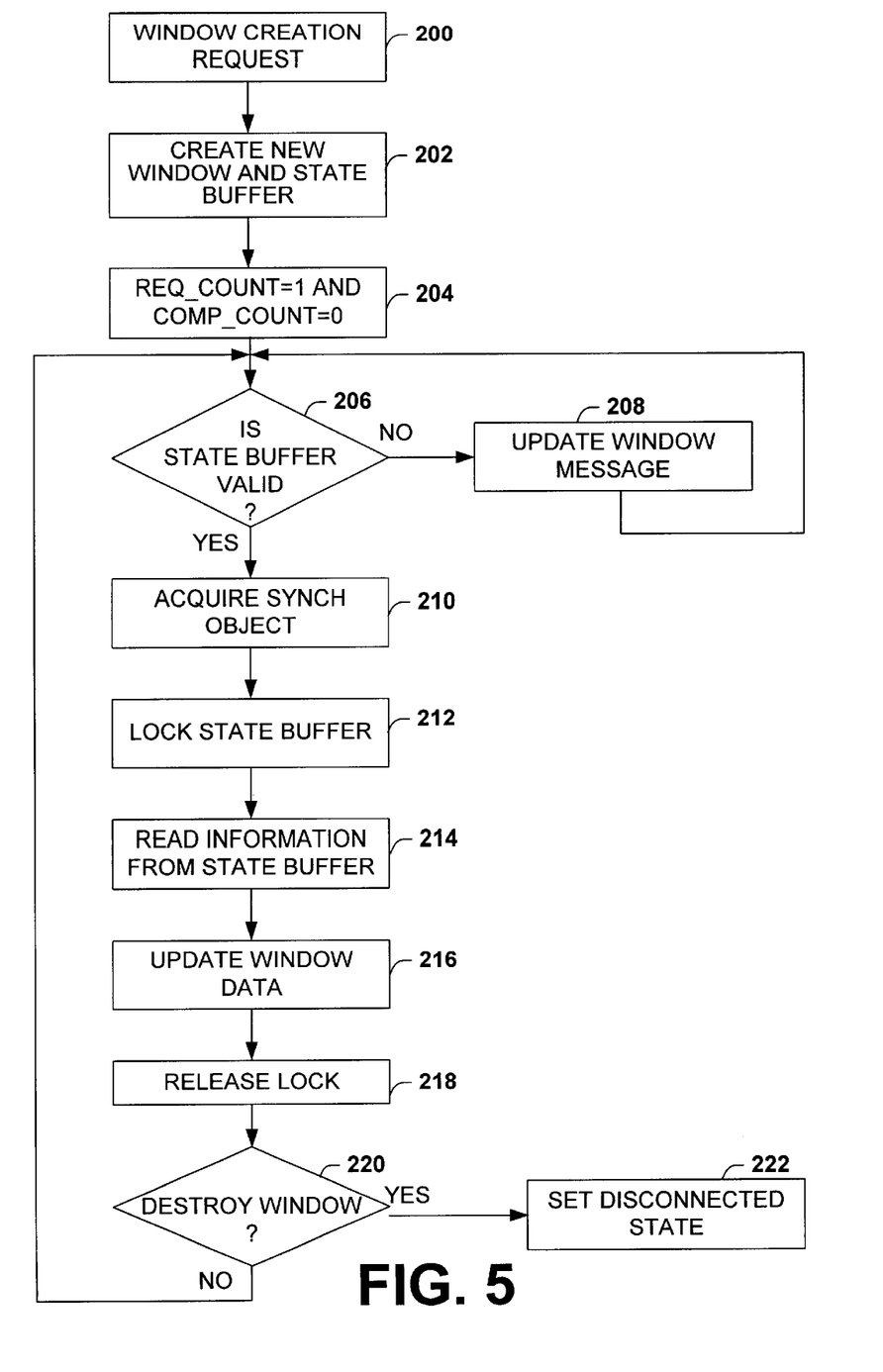
FIG. 5 is a flow diagram illustrating a methodology associated with an interface thread in accordance with the present invention.
Figure 6:
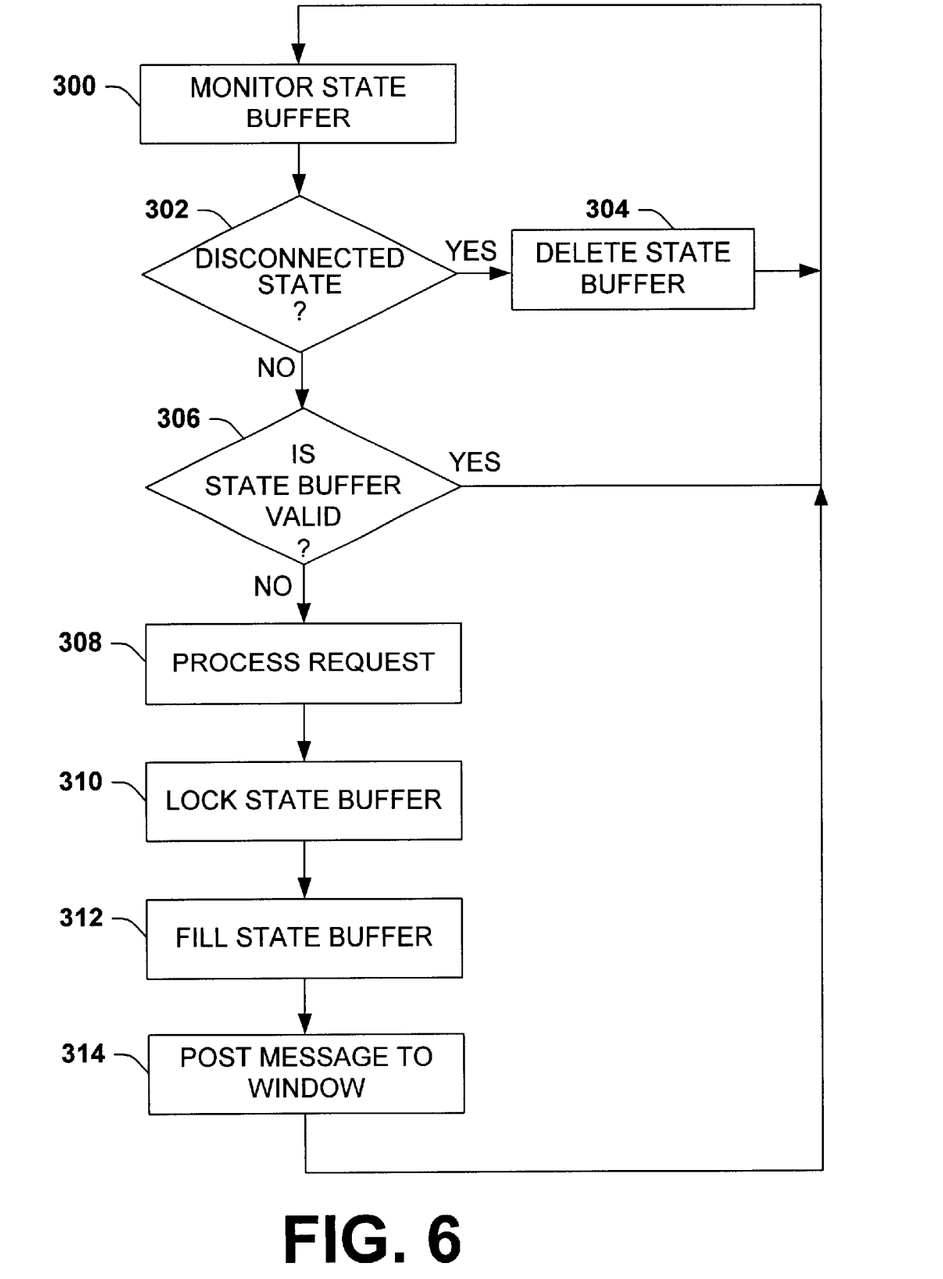
FIG. 6 is flow diagram illustrating a methodology associated with an engine thread in accordance with the present invention.
Figure 7:
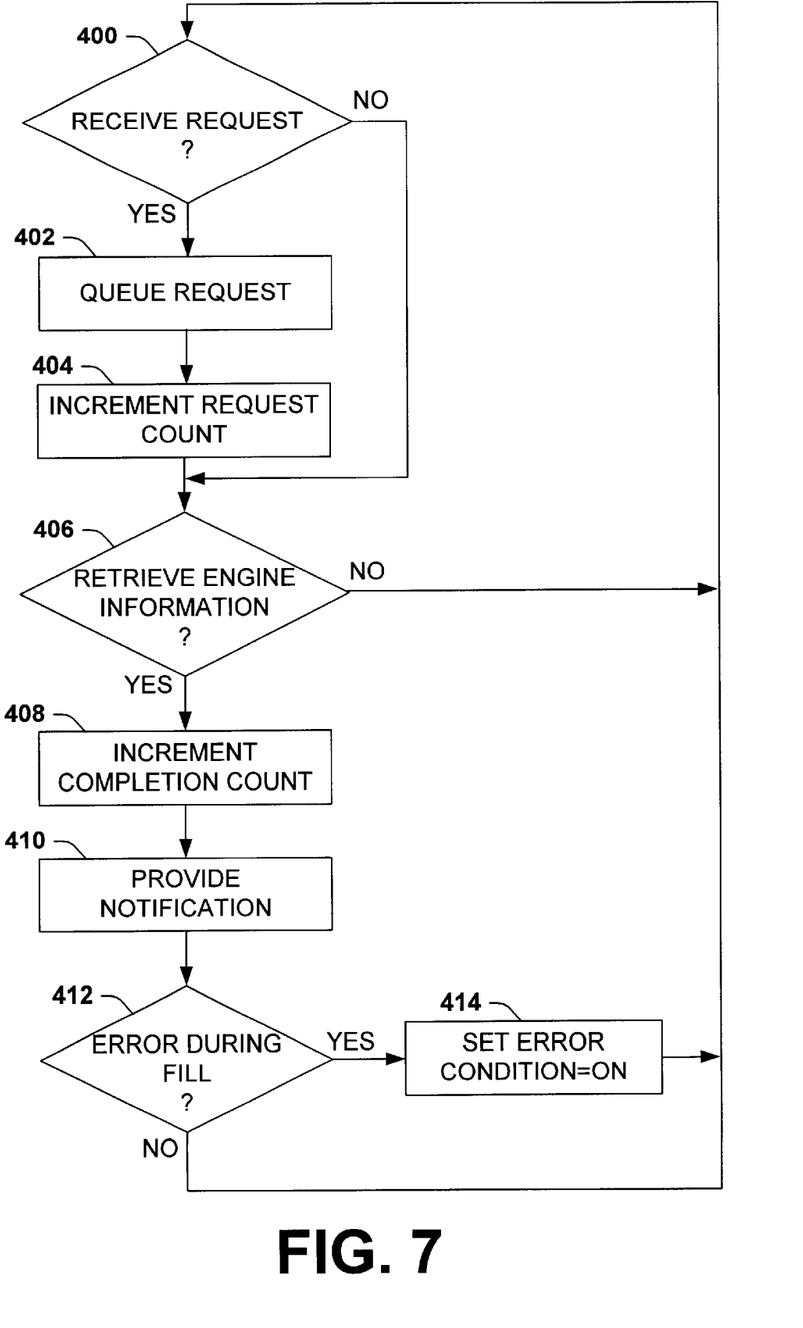
FIG. 7 is a flow diagram illustrating a methodology associated with a state buffer in accordance with the present invention.

In view of the foregoing structural, functional, and graphical features described above, methodologies in accordance with various aspects of the present invention will be better appreciated with reference to FIGS. 5–7. While, for purposes of simplicity of explanation, the methodologies of FIGS. 5–7 are shown and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect the present invention.

FIG. 5 is a flow diagram illustrating the methodology that may be implemented, in accordance with an aspect of the present invention, in connection with an interface thread. The process begins at step 200 in which a window creation request is received. The process then proceeds to step 202 in which a new window and state buffer are created in a response to the creation request. As described herein, the state buffer provides a dynamically sizable channel to facilitate communication between a window interface element and an engine thread.

From step 202 the process proceeds to step 204, in which a request count and completion count are initialized. For example, the request count may be set to one and the completion count may be set to equal to zero, such that there is a mismatch between the respective values. A mismatch between the two values initiates a check by the engine thread of the newly created state buffer. From step 204, the process proceeds to step 206 in which a determination is made as to whether the state buffer is valid. This determination may include, for example, a comparison of the request count and the completion count. If the completion count is not equal to the request count, the state buffer is invalid. The state buffer also may have an invalid condition if an error condition exists, such as in response to a filler routine not properly filling the state buffer. If the state buffer is invalid, the process proceeds to step 208 in which the window message is updated. From step 208, the process returns to step 206. If the determination at step 206 is affirmative, indicating that the state buffer is valid (e.g., no error condition and the request count equals the completion count), the process proceeds to step 210.

At step 210, the interface thread acquires a synchronization object. From step 210, the process proceeds to step 212 in which the state buffer is locked. While the state buffer is locked, the engine thread is unable to fill additional data to the state buffer. From step 212, the process proceeds to step 214, in which information is read from the state buffer. The information, for example, may include a message that is to be displayed or other data indicative of an operating characteristic of the associated application. Next, at step 216, the window data structures are updated based on the information read at step 214. Once the window has been updated, the process proceeds to step 218 in which the synchronization lock is released. Releasing the lock enables the engine thread to fill data to the state buffer as well as to permit data to be read therefrom.

From step 218, the process proceeds to step 220 in which a determination is made as to whether the interface thread has destroyed the window created at step 202. If the window is not destroyed, the process returns to step 206. If the window has been destroyed, the process proceeds to step 222. At step 222, the interface thread sets the state buffer to a disconnected state. The state buffer may then be deleted, such as in response to the engine thread detecting the disconnected state of the state buffer. From step 222, the process ends.

FIG. 6 is a flow diagram illustrating a methodology that may be implemented in connection with an engine thread in accordance with an aspect of the present invention. The process begins at step 300, in which the engine thread monitors the condition of each state buffer, which may be identified in a state buffer list. From step 300, the process proceeds to step 302 in which a determination is made as to whether the state buffer is in a disconnected state, such as may be set by an interface thread. If the state buffer is in a disconnected state, the process proceeds to step 304, in which the engine thread deletes the state buffer. From step 304 the process returns to step 300 in which the engine thread monitors the state buffers. If the determination at step 302 is negative, the process proceeds to step 306.

At step 306, a determination is made as to whether the state buffer has a valid condition. This determination may include determining whether there is a mismatch between the request count and the completion count values or an error condition exists. If the state buffer has a valid condition, the process returns to step 300. If the state buffer has an invalid condition, the process may proceed to step 308. At step 308, the engine thread obtains the requests from the state buffer and processes the request accordingly. The processing includes the engine thread retrieving information associated with the request. The process proceeds to step 310 in which the engine thread acquires a synchronization lock on the state buffer. The synchronization lock of the state buffer may vary as a function of the request count and completion count. Next, the process proceeds to step 312 in which the engine thread fills state buffer with the retrieved information. From step 312, the process proceeds to step 314, in which a notification message is posted to a window associated with the completed request. From step 314, the process returns to step 300.

FIG. 7 is a flow diagram illustrating a methodology that may be implemented in connection with a state buffer in accordance with an aspect of the present invention. The process begins at step 400 in which a determination is made as to whether a request has been received, such as from the interface thread. If a request has been received, the request is queued and the process proceeds to step 402. At step 402, the request is queued in the state buffer. The process proceeds to step 404, in which the request count is incremented. If the determination at step 400 is negative, the process proceeds to step 406. From step 404 the process also proceeds to step 406.

At step 406, a determination is made as to whether engine information has been retrieved, such as from the engine thread. If the determination is negative, the process returns to step 400. If the determination at step 406 is affirmative, the process proceeds to step 408. At step 408, the completion count is incremented in response to the information being filled to the state buffer. Next, at step 410, a notification is provided to the interface thread that a request has been completed. The notification alerts the interface thread that it may attempt to retrieve information, such as by accessing the state buffer. However, the access to the state buffer may depend on whether an error condition exists and/or whether the request count matches the completion count (e.g., Is the state buffer valid?). From step 410, the process proceeds to step 412, in which a determination is made as to whether an error has occurred during the fill process. An error may occur, for example, by the fill routine failing to properly fill the information to the state buffer. If the determination at step 412 is affirmative, the process proceeds to step 414 in which an error condition is set to the ON condition. From step 414, the process returns to step 400. If the determination at step 412 is negative, indicating no error during a fill, the process also returns to step 400.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system to facilitate communication between a user interface and a process, comprising:
   a first thread associated with the user interface;
   a second thread associated with the process for implementing requests received from the user interface; and
   at least one state buffer object operable to store state data for controlling ownership of the at least one state buffer by the first and second threads for retrieving or filling other data to the state buffer object.

2. The system of claim 1, wherein the at least one state buffer object is dynamically scalable for storing the state data and the other data.

3. The system of claim 2, wherein the at least one state buffer object provides a communication channel associated with a corresponding interface element of the first thread.

4. The system of claim 3, wherein the at least one state buffer object comprises a plurality of state buffer objects, each being operable to store state data adapted to control ownership to the respective state buffer object by the first and second threads, each state buffer object providing a communication channel to facilitate communication between a corresponding interface element of the first thread and the second thread.

5. The system of claim 1, wherein the at least one state buffer object is operable to send a notification to the first thread indicative of a request being filled by the second thread.

6. The system of claim 1, wherein the at least one state buffer object includes a synchronization feature for coordinating at least one of access to and ownership of the at least one state buffer object by the first and second threads.

7. The system of claim 6, wherein the synchronization feature includes a request count and a completion count, the request count being adjusted in response to receiving data from the first thread, the completion count being adjusted in response to receiving data from the second thread, the synchronization feature determining at least one of access to and ownership of the at least state one buffer object as a function of the request count and the completion count.

8. The system of claim 1, wherein the first thread includes graphical user interface elements to facilitate user interaction with a debugging system.

9. A multi-threaded interface architecture for a debugger system comprising:
   a user interface thread to facilitate user interaction with the debugging system;
   an engine thread associated with the debugger system responsive to requests from the user interface thread; and
   a state buffer for storing state data adapted to control ownership of the state buffer by at least one of the user interface thread and the engine thread, the user interface thread and engine thread communicating other data through the state buffer so as to mitigate pausing at the user interface.

10. The architecture of claim 9, wherein the state buffer is dynamically scalable for storing the state data and other data to facilitate communication between the user interface thread and the engine thread.

11. The architecture of claim 9, wherein the user interface thread includes at least one user interface element, the state buffer providing a communication channel between the at least one user interface element and the engine thread.

12. The architecture of claim 9, wherein the user interface thread includes a plurality of user interface elements, wherein the architecture comprises a plurality of state buffers, each being operable to store state data adapted to control ownership to the respective state buffer by the user interface thread and engine thread, each state buffer providing a communication channel to facilitate communication between a corresponding one of the plurality of user interface elements and the engine thread.

13. The architecture of claim 12 further including a filler routine associated with the engine thread for queuing data in the state buffer object.

14. The architecture of claim 13, wherein a different filler routine is associated with different types of the plurality of user interface elements.

15. The architecture of claim 9, wherein the state buffer is operable to send a notification to the user interface thread in response to a request being filled by the engine thread.

16. The architecture of claim 9, wherein the state buffer includes a synchronization feature for coordinating at least one of access to and ownership of the at least state buffer by the user interface thread and the engine thread.

17. The architecture of claim 16, wherein the synchronization feature further includes a request count and a completion count, the request count being adjusted in response to receiving data from the user interface thread, the completion count being adjusted in response to receiving data from the engine thread, the synchronization feature determining at least one of access to and ownership of the state buffer as a function of the request count and the completion count.

18. A method for synchronizing data communication between at least two threads in a multi-threaded architecture, the method comprising:
   receiving at a state buffer a request from a first thread and updating control data at the state buffer to a first condition based on the request;
   detecting in a second thread a condition of the control data and providing other data to the state buffer based on the condition of the control data;
   updating the control data to a second condition based on the other data being provided to the state buffer; and
   controlling retrieval by the first thread of the other data as a function of the condition of the control data.

19. The method of claim 18, wherein the control data includes a request count and completion count, the method further including adjusting the request count based on receiving a request from the first thread and adjusting the completion count based on other data being provided to the state buffer by the second thread.

20. The method of claim 19 further including controlling ownership of the state buffer by the first and second thread as a function of the completion count and the request count.

21. The method of claim 18 further including notifying the first thread based on the data being provided to the state buffer by the second thread.

22. The method of claim 21 further including attempting to gain ownership of the state buffer by the first thread in response to the step of notifying, the ownership of the state buffer by the first thread depending upon the condition of the state buffer.

23. A computer-readable medium having computer executable instructions for performing the method of claim 18.

24. A computer-readable medium having computer executable instructions for:
   providing a first thread associated with a user interface and a second thread associated with an engine;
   generating at least one state buffer to store state data and other data; and
   programming the state buffer to control ownership of the state buffer by the first and second threads based on the state data for retrieving or filling the other data to the state buffer.

25. The computer-readable medium of claim 24 having further computer-executable instructions for dynamically configuring the state buffer for storing the state data and the other data.

26. The computer-readable medium of claim 24 having further computer-executable instructions for providing at least one user interface element associated with the first thread and programming the state buffer to provide a communication channel between the at least one interface element and the second thread.

27. The computer-readable medium of claim 24 having further computer-executable instructions for generating a state buffer for each user interface element associated with the first thread, each state buffer being operable to store state data adapted to control ownership to the respective buffer by the first and second threads, each state buffer providing a communication channel to facilitate communication between a corresponding user interface element and the second thread.

28. The computer-readable medium of claim 24 having further executable instructions for notifying the first thread in response to a request being filled by the second thread.

29. The computer-readable medium of claim 24 having further computer-executable instructions for coordinating at least one of access to and ownership of the at least state buffer by the first and second threads.

30. The computer-readable medium of claim 28, wherein the synchronization feature further includes a request count and a completion count, the computer-readable medium having further computer-executable instructions for adjusting the request count in response to receiving data from the first thread and adjusting the completion count in response to receiving data from the second thread, the synchronization feature determining at least one of access to and ownership of the at least state buffer as a function of the request count and the completion count.

31. The computer-readable medium of claim 24, wherein the first thread includes graphical user interface elements to facilitate user interaction with a debugging system.

32. A computer-readable medium having stored thereon a data structure for a state buffer comprising:
   a first field for storing request data;
   a second field for storing completion data indicative of requests that have been completed by an associated process;
   a message field for storing notification data associated with requests that have been completed; and
   a data field for storing data provided by the associated process in response to requests stored in the first field.

33. The computer-readable medium of claim 32, wherein at least one of the fields is dynamically scalable.

34. The computer-readable medium of claim 32, further including an error field for indicating an error associated with at least one of storing data in the data field and retrieving data from the data field.

* * * * *